(12) United States Patent
Wilke et al.

(10) Patent No.: US 11,203,887 B2
(45) Date of Patent: Dec. 21, 2021

(54) SIMPLIFIED VEHICLE DOOR SWITCH DEVICE WITH A LARGE ACTUATING SURFACE

(71) Applicant: ILLINOIS TOOL WORKS INC., Glenview, IL (US)

(72) Inventors: Zsolt Wilke, Bad Mergentheim (DE); Joachim Oberst, Grossrinderfeld (DE); Andreas Rudolf, Würzburg (DE); Matthias Seubert, Giebelstadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 505 days.

(21) Appl. No.: 16/160,007

(22) Filed: Oct. 15, 2018

(65) Prior Publication Data

US 2019/0112842 A1 Apr. 18, 2019

(30) Foreign Application Priority Data

Oct. 18, 2017 (DE) .......................... 102017124368.2

(51) Int. Cl.
*E05B 81/78* (2014.01)
*E05B 81/76* (2014.01)
(Continued)

(52) U.S. Cl.
CPC .............. *E05B 81/78* (2013.01); *E05B 79/06* (2013.01); *E05B 81/76* (2013.01); *E05B 85/10* (2013.01);
(Continued)

(58) Field of Classification Search
CPC .......... E05B 81/78; E05B 79/06; E05B 81/76; E05B 85/10; E05B 85/14; E05B 77/04;
(Continued)

(56) References Cited

U.S. PATENT DOCUMENTS

| 6,639,161 B2 * | 10/2003 | Meagher | ................. E05B 81/76 |
| | | | 200/341 |
| 7,375,299 B1 * | 5/2008 | Pudney | .................... E05B 81/78 |
| | | | 200/61.62 |

(Continued)

FOREIGN PATENT DOCUMENTS

| CN | 105089382 A | 11/2015 |
| DE | 19930861 A1 | 1/2001 |

(Continued)

*Primary Examiner* — Edwin A. Leon
(74) *Attorney, Agent, or Firm* — Thompson Hine LLP

(57) ABSTRACT

A switch actuating device (1) for a vehicle door includes an actuating element (10) with an actuating surface (11), a mechanical switch (20) and a mechanism (30). The switch is secured on a first component/component group (31). A lever (32) is mounted for pivot in relation to the first component/component group (31). A first region (32.2) of the lever is connected to a first part of the actuating element (10) via a first articulation (10.1). A second part of the actuating element (10) is mounted on the first component/component group (31) via a second articulation (10.2). The actuating element (10) bends when the actuating surface (11) is subjected to manual pressure causing the distance between the first articulation (10.1) and the second articulation (10.2) to shorten, which causes the lever (32) to pivot toward the switch such that the switch is switched.

16 Claims, 3 Drawing Sheets

(51) Int. Cl.
*H01H 21/22* (2006.01)
*H01H 3/04* (2006.01)
*H01H 3/02* (2006.01)
*E05D 1/02* (2006.01)
*E05B 79/06* (2014.01)
*E05B 85/10* (2014.01)
*H01H 3/12* (2006.01)
*H01H 3/20* (2006.01)
*H01H 3/38* (2006.01)
*H01H 3/00* (2006.01)
*F16B 1/00* (2006.01)
*B60R 16/00* (2006.01)
*H01H 21/24* (2006.01)
*E05D 1/00* (2006.01)

(52) U.S. Cl.
CPC ............... *E05D 1/02* (2013.01); *H01H 3/02* (2013.01); *H01H 3/04* (2013.01); *H01H 3/122* (2013.01); *H01H 21/22* (2013.01); *B60R 16/005* (2013.01); *E05D 1/00* (2013.01); *F16B 2001/0078* (2013.01); *H01H 3/20* (2013.01); *H01H 3/38* (2013.01); *H01H 21/24* (2013.01); *H01H 2003/007* (2013.01); *H01H 2231/026* (2013.01); *Y10T 403/32163* (2015.01)

(58) Field of Classification Search
CPC .. E05B 81/64; E05D 1/02; E05D 1/00; H01H 3/02; H01H 3/04; H01H 3/122; H01H 21/22; H01H 3/20; H01H 3/38; H01H 21/24; H01H 2003/007; H01H 2231/026; Y10T 403/32163; B60R 16/005; B60R 21/00
See application file for complete search history.

(56) References Cited

U.S. PATENT DOCUMENTS

| | | |
|---|---|---|
| 9,834,964 B2 | 12/2017 | van Wiemeersch |
| 2013/0076048 A1 | 3/2013 | Aerts |
| 2015/0330117 A1 | 11/2015 | van Wiemeersch |
| 2018/0051498 A1 | 2/2018 | van Wiemeersch |

FOREIGN PATENT DOCUMENTS

| | | |
|---|---|---|
| DE | 202015102480 | 7/2015 |
| EP | 1108834 A2 | 6/2001 |
| WO | WO 2016/077068 | 5/2016 |

\* cited by examiner

SIMPLIFIED VEHICLE DOOR SWITCH DEVICE WITH A LARGE ACTUATING SURFACE

TECHNICAL FIELD

The invention relates in general to switch devices for vehicle doors.

BACKGROUND

The prior art WO2016/077068A1 shows such a switch device for a microswitch for a vehicle door, wherein the particular feature is that the possible actuating surface, on which a user can press in order to actuate the switch, is of a very large size relative to the size of the switch, but nevertheless a good pressure point is provided at each point on the surface.

The inventors have found it disadvantageous that this device, although it functions very well, is complex.

SUMMARY

The object on which the invention is based was to improve the above-mentioned disadvantage. The object is achieved by the invention, in particular as defined in the independent claims.

In particular, this object is achieved by a switch-actuating device for a vehicle door, wherein the device has an actuating element with an actuating surface, and also has a mechanical switch, preferably microswitch, and a mechanism by means of which a compressive force to which the actuating surface is subjected by a user is transmitted to the switch in order for the switch to be switched, wherein the mechanism has a first component or a first component group, on which the switch is secured at least in the switching direction, i.e., the direction in which pressure is exerted on the switch in order to switch same, and has a lever, which is mounted such that it can be pivoted, via a pivot pin, in relation to the first component or the first component group and which is connected to the actuating element, on a first side of the actuating surface, via a first articulation at a first region of the lever, wherein the actuating element, on a second side of the actuating surface, is mounted on the first component or the first component group via a second articulation, wherein the actuating element is of flexible configuration, and therefore, when the actuating surface is subjected to manual pressure, the actuating element bends or deforms in a flexible manner and causes the distance between the first articulation and the second articulation to shorten, and therefore causes the lever to pivot about the pivot pin, and wherein the switch is arranged such that, by virtue of the lever pivoting, the switch is switched via a second region of the lever.

In particular, this object is furthermore achieved by a door-handle module, wherein the door-handle module has a switch-actuating device for a vehicle door according to the invention.

In particular, this object is furthermore achieved by a vehicle door, wherein the vehicle door has a switch-actuating device for a vehicle door according to the invention or a door-handle module according to the invention.

By this means, a switch device for a vehicle door is provided, said switch device being able to be manufactured in a simple manner and in which the switch is actuable over a large surface. A further advantage which is present even in the case of small surfaces is that, with this solution, the space below the actuating surface (in FIGS. 1A-1B) is not occupied by the mechanism and can therefore be available for a different functionality or can remain free. In addition, the effort expended on actuating the switch and also the relative position of the switch can be determined via the different securing of the lever arms between switch and pivot pin and between first articulation and pivot pin.

The switch is preferably connected or connectable effectively in terms of signal to an electronic door catch or door-opening actuator, that is to say that switching of the switch generates a signal which brings about an activation of the door catch or of the door-opening actuator.

The vehicle door is, for example, a vehicle side door or the trunk cover or an interior flap, for example a glove compartment flap, of a vehicle.

The vehicle is preferably a motor vehicle.

The actuating element is preferably flexible by having, at least at one location of the actuating surface, an articulation or a flexible region which connects two parts of the actuating element. The switch is, for example, arranged directly next to the second region of the lever, but it is also conceivable to switch the switch indirectly, via an intermediate element between lever and switch. The switch or the intermediate element is preferably arranged on a curve point through which the lever would pass during free rotation about the pivot pin.

The actuating element is preferably leaf-shaped in the region of the actuating surface, and particularly preferably is a plate having a small thickness at the points which are flexible. The points of smaller thickness preferably form a film hinge. The actuating element is preferably more flexurally rigid in between.

The actuating surface is preferably the surface which is pressure-active, i.e., in which pressure applied to the surface actuates the switch. The actuating surface can be covered toward the outside (i.e., toward the side from which the user exerts pressure on the surface) with a flexible coating (for example a rubber-like covering).

The first region and the second region preferably lie on the same side of the lever relative to the pivot pin. By this means, the space required transversely with respect to the actuating surface is primarily limited to one side, and therefore, for example, the lever and the two regions can be or are arranged further in the door interior while the actuating surface can be or is arranged close to the door outer skin. Alternatively, they are located on different sides of the pivot pin. The device can thereby be adapted to the respectively predetermined construction space situation.

In a further exemplary embodiment of the invention, it is provided that the lever and the actuating element are formed in one piece as a single component.

Even simpler production of the device is thereby achieved. In this case, the first articulation is formed as a film hinge or by the flexibility of the actuating element.

In a further exemplary embodiment of the invention, it is provided that the first region is spaced apart from the pivot pin by a smaller distance than the second region.

The effect achieved by this is that even a small actuation leads to switching of the switch.

In a further exemplary embodiment of the invention, it is provided that the pivot pin and the actuating surface enclose an angle greater than 0° and smaller than 180°, and wherein the first articulation has at least two degrees of freedom.

By this means, an actuating surface which is angled with respect to the pivot pin is provided, which may be advantageous, for example, for certain installation situations. A wide variety of installation situations can therefore be realized. The first articulation is preferably in the form of a ball and socket joint. The first articulation is particularly preferably formed by a thin region, which is flexible in a plurality of directions, when lever and actuating element are formed in one piece.

In a further exemplary embodiment of the invention, it is provided that the vehicle door and/or the door-handle module and/or the switch-actuating device for a vehicle door form a handle region which has a longitudinal direction in order for a number of fingers of a user to rest along the longitudinal direction, wherein the extent of the handle region in the longitudinal direction is at least 2 cm, preferably 6 cm, particularly preferably 8 cm, wherein the actuating surface forms part of the handle region and is arranged over at least 80%, preferably 100%, of the handle region, as seen in the longitudinal direction.

By this means, the handle region is equipped with an actuating surface which can be pressed over a large region.

In a further exemplary embodiment of the invention, it is provided that the switch-actuating device for a vehicle door, on at least one side of the handle region, is mounted on a component of the door-handle module and/or of the vehicle door via at least one bearing, which allows a degree of freedom in the longitudinal direction, wherein the component consists of a material different to that from which the actuating element and/or the first component or the first component group of the switch-actuating device for a vehicle door are/is made, and therefore, in the case of a change in temperature, it is possible to compensate for a relative change in length between the component and the actuating element and/or the first component or the first component group by a relative movement along the degree of freedom of the bearing.

This makes it possible to compensate for temperature differences which could otherwise lead to possible spurious releases of the switch. In particular, this is critical in the case of very long actuating elements, e.g. when the actuating element measures more than 10 cm in the longitudinal direction. The device is preferably fixed on the other side of the handle region via a fixed bearing (for example a screw).

BRIEF DESCRIPTION OF THE DRAWINGS

The invention will now be illustrated further by way of example with reference to drawings, in which.

DETAILED DESCRIPTION

Figure 1A:
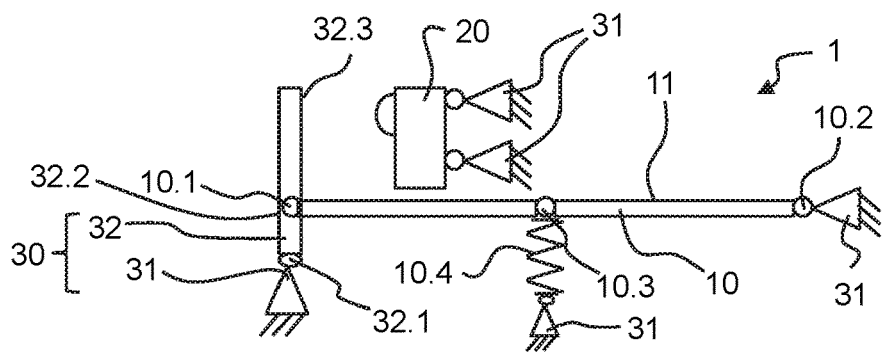
FIGS. 1A and B show a schematic diagram of a switch device according to the invention for a vehicle door in an inoperative position (1A) and pressed position (1B)
Figure 1B:
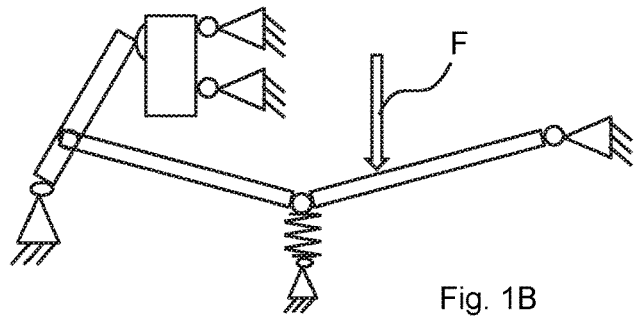

FIGS. 1A and 1B show a schematic diagram of a switch device according to the invention for a vehicle door in an inoperative position 1A and pressed position 1B. The configuration is such that the device 1 has an actuating element 10 with an actuating surface 11, and also has a mechanical switch 20, here a microswitch, and a mechanism 30 by means of which a compressive force F to which the actuating surface 11 is subjected by a user is transmitted to the switch 20 in order for the switch 20 to be switched, wherein the mechanism 30 has a first component or a first component group 31, on which the switch is secured at least in the switching direction, i.e., the direction in which pressure is exerted on the switch in order to switch same (here from the left to the right), and has a lever 32, which is mounted such that it can be pivoted, via a pivot pin 32.1, in relation to the first component or the first component group 31 and which is connected to the actuating element 10, on a first side of the actuating surface 11, via a first articulation 10.1 at a first region 32.2 of the lever 32, wherein the actuating element 10, on a second side of the actuating surface 11, is mounted on the first component or the first component group 31 via a second articulation 10.2, wherein the actuating element 10 is of flexible configuration, and therefore, when the actuating surface 11 is subjected to manual pressure, the actuating element bends in a flexible manner and causes the distance between the first articulation 10.1 and the second articulation 10.2 to shorten, and therefore causes the lever 32 to pivot about the pivot pin 32.1, and wherein the switch 20 is arranged such that, by virtue of the lever 32 pivoting, the switch is switched via a second region 32.3 of the lever. In this schematic diagram, the flexibility of the actuating element 10 is illustrated by an additional articulation 10.3 and a spring 10.4, which is also understood according to the invention as meaning a flexible actuating element which bends in a flexible manner. The switch 20 is arranged here next to the lever 32 level with the second region 32.3 of the lever 32, and therefore the switch 20 can be acted upon directly by the lever 32. The first region 32.2 and the second region 32.3 are located on the same side of the lever 32 relative to the pivot pin 32.1. The first region 32.2 is spaced apart from the pivot pin 32.1 by a smaller distance than the second region 32.3.

Figure 2A:
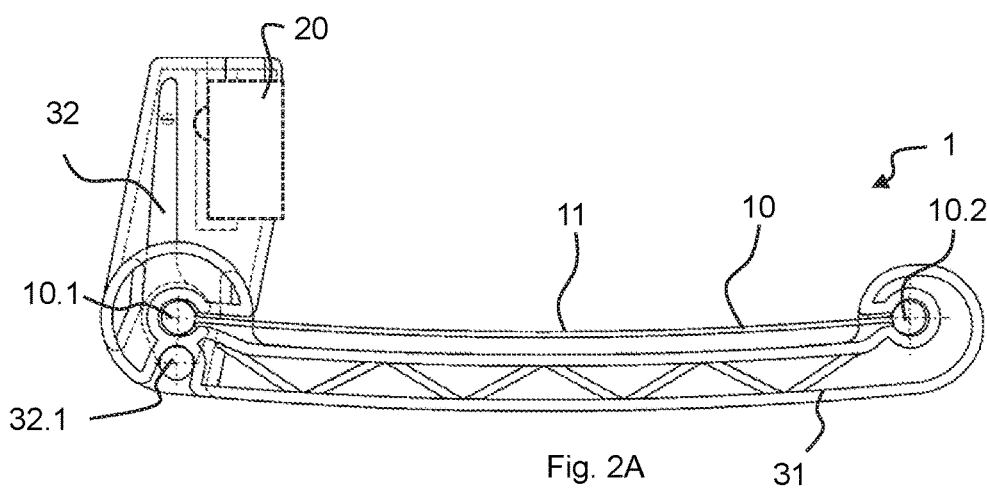
FIG. 2A shows a top view of a switch device according to the invention for a vehicle door, on the basis of that in FIGS. 1A-1B.

FIG. 2A shows a top view of a switch device according to the invention for a vehicle door, on the basis of that in FIGS. 1A-1B. The actuating element 10 is continuously flexible in the region of the actuating surface 11 and therefore forms the articulation 10.3. The actuating element 10 is leaf-shaped in the region of the actuating surface 11. The actuating element 10 is composed of plastic. In addition, the following parts are likewise composed of plastic: lever 32, first component 31.

Figure 2B:
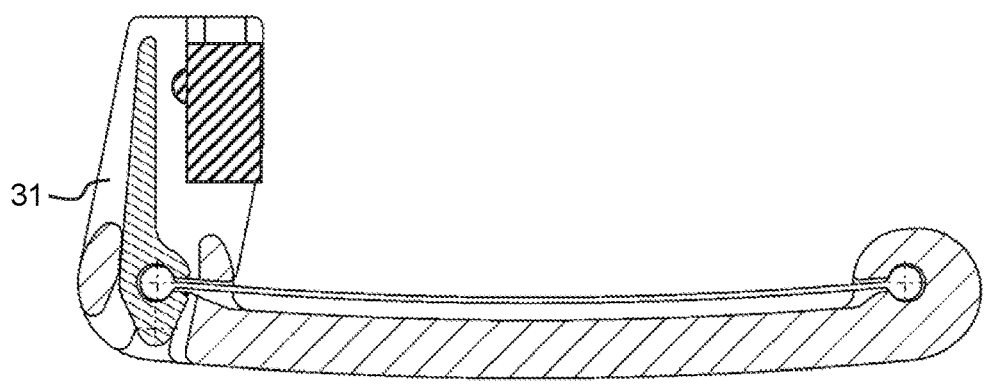
FIG. 2B shows a section through the device according to FIG. 2A.

FIG. 2B shows a section through the device according to FIG. 2A.

Figure 2C:
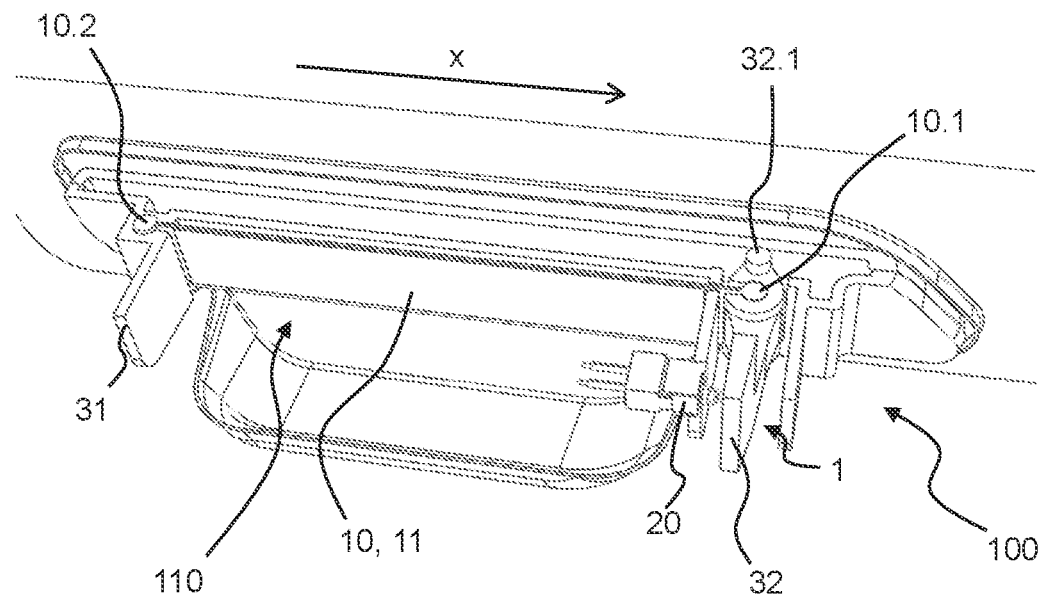
FIG. 2C shows, by way of an excerpt and looking at the outer sheet from the inside, a vehicle door with the switch device for a vehicle door from FIGS. 2A and 2B, which is attached to the vehicle door as part of a handle module.

FIG. 2C shows, by way of an excerpt and looking at the outer sheet from the inside, a vehicle door with the switch device for a vehicle door from FIGS. 2A-2B which is attached to the vehicle door as part of a handle module. The vehicle door is a side door of a vehicle. The configuration is such that the door-handle module 100 has the switch-actuating device 1 for a vehicle door. The configuration is such that the vehicle door has the door-handle module 100. The switch 20 is connected effectively in terms of signal to an electronic door catch indirectly via an electronic control unit. The configuration is such that the vehicle door and the door-handle module 100 and the switch-actuating device 1 for a vehicle door together form a handle region 110 which has a longitudinal direction x in order for a number of fingers of a user to rest along the longitudinal direction x, wherein the extent of the handle region 110 in the longitudinal direction is at least 8 cm, wherein the actuating surface 11 forms part of the handle region 110 and is arranged over at least 100% of the handle region 110, as seen in the longitudinal direction x.

Figure 3A:
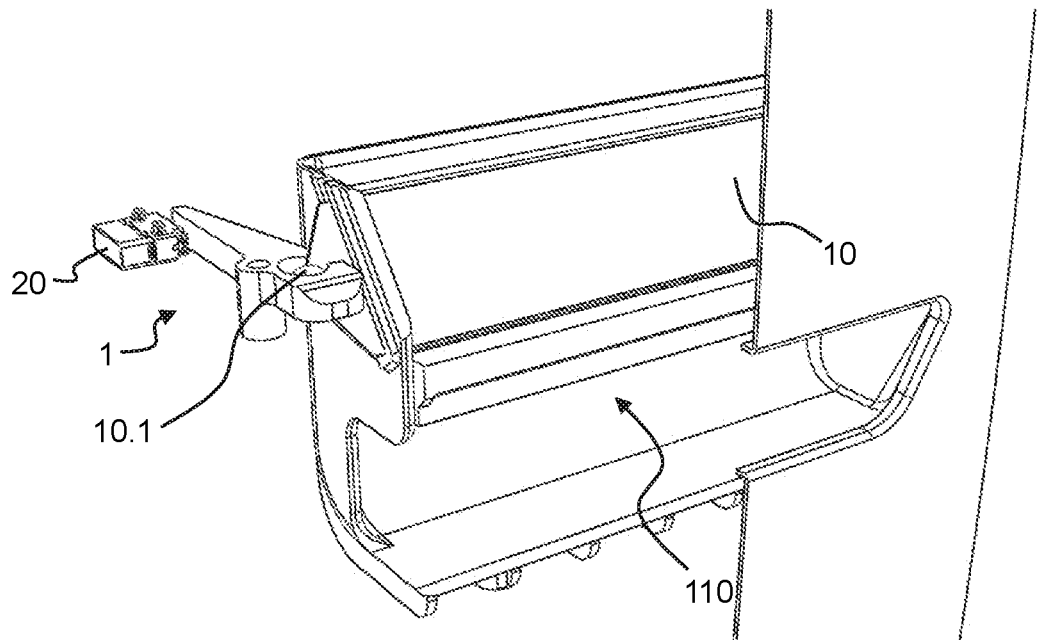
FIG. 3A shows, by way of an excerpt and looking at the outer sheet, shown by way of an excerpt, from the outside, a further vehicle door with a further switch device for a vehicle door on the basis of the switch device for a vehicle door that is shown in FIGS. 1A-1B and 2A-2B and attached to a handle module of the vehicle door.

FIG. 3A shows, by way of an excerpt and looking at the outer sheet, which is shown by way of an excerpt, from the outside, a further vehicle door with a further switch device for a vehicle door, on the basis of the switch devices for a vehicle door shown in FIGS. 1A-1B and 2A-2B, and also the vehicle door from FIG. 2C, wherein the switch device for a vehicle door is attached to a further handle module of the vehicle door. The configuration is such that the pivot pin 32.1 and the actuating surface 11 enclose an angle (a) greater than 0° and smaller than 180°, here approximately 45°, and wherein the first articulation 10.1 has at least two degrees of freedom, unlike in FIGS. 1A to 2C. The first articulation 10.1 is in the form of a ball and socket joint. The first region 32.2 and the second region 32.3 are located on different sides of the lever 32 relative to the pivot pin 32.1, unlike in FIGS. 1A to 2C.

Figure 3B:
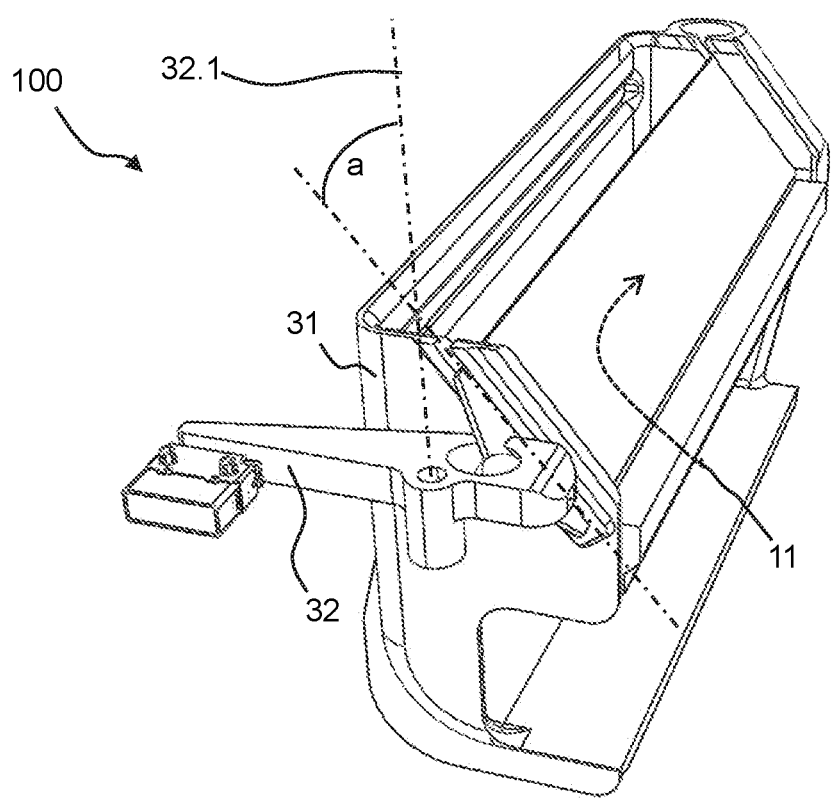
FIG. 3B shows the door-handle module from FIG. 3A in isolation from a different perspective.

FIG. 3B shows the door-handle module from FIG. 3A in isolation from a different perspective.

Figure 4:
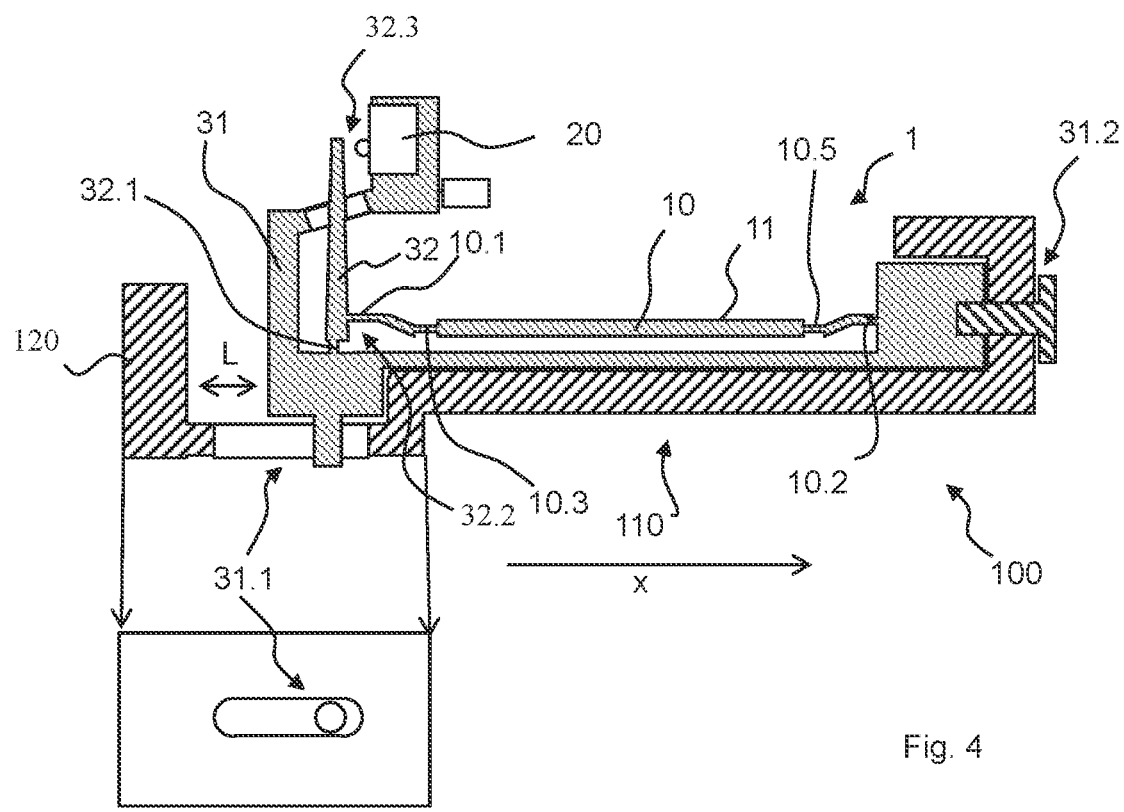
FIG. 4 shows a door-handle module on the basis of those from FIGS. 2A-3B.

FIG. 4 shows a door-handle module 100 on the basis of those from FIGS. 2A-3B. Unlike previously, the lever 32 and the actuating element 10 are formed in one piece as a single component. In addition, the actuating element 10 and the first component 31 are formed from the same material. Lever 32, first component 31 and actuating element 10 are thus designed as a single component. The articulations 10.1, 10.2 and the articulation about the pivot pin 32.1 are in the form of film hinges. The flexibility of the actuating element 10 for shortening the distance between the articulations 10.1 and 10.2 is likewise formed by means of additional articulations 10.3 and 10.5, likewise film hinges. In addition, the configuration is such that the switch-actuating device 1 for a vehicle door, at least on one side of the handle region 110, is mounted on a component 120 of the door-handle module 100 via at least one bearing 31.1, which allows a degree of freedom in the longitudinal direction x, wherein the component 120 consists of a material different to that from which the actuating element 10 and the first component 31 are made, and therefore, in the case of a change in temperature, it is possible to compensate for a relative change in length L between the component 120 and the actuating element 10 and the first component 31 by a relative movement along the degree of freedom of the bearing 31.1. The device 1 is fixed on the other side of the handle region 110 via a fixed bearing 31.2 (e.g., screw).

REFERENCE SIGNS

1 Switch device for a vehicle door
10 Actuating element
10.1 first articulation
10.2 second articulation
10.3 additional articulation
10.4 Spring element
10.5 additional articulation
11 Actuating surface
20 Switch
30 Mechanism
31 first component or first component group
31.1 Bearing
31.2 further bearing
32 Lever
32.1 Pivot pin
32.2 first region
32.3 second region
100 Door-handle module
110 Handle region
120 Component
x Longitudinal direction
F Compressive force
a Angle
L Change in length

What is claimed is:

1. A switch-actuating device (1) for a vehicle door, wherein the device (1) has an actuating element (10) with an actuating surface (11), and also has a mechanical switch (20) and a mechanism (30) by means of which a compressive force (F) applied to the actuating surface (11) is transmitted to the switch (20) in order for the switch (20) to be switched, wherein the mechanism (30)
    has a first component or a first component group (31), on which the switch is secured at least in a switching direction, and
    has a lever (32), which is mounted such that it can be pivoted, via a pivot pin (32.1), in relation to the first component or the first component group (31) and which is connected to the actuating element (10), on a first side of the actuating surface (11), via a first articulation (10.1) at a first region (32.2) of the lever (32),
    wherein the actuating element (10), on a second side of the actuating surface (11), is mounted on the first component or the first component group (31) via a second articulation (10.2), wherein the actuating element (10) is of flexible configuration, and therefore, when the actuating surface (11) is subjected to manual pressure, the actuating element bends in a flexible manner and causes the distance between the first articulation (10.1) and the second articulation (10.2) to shorten, and therefore causes the lever (32) to pivot about the pivot pin (32.1), and wherein the switch (20) is arranged such that, by virtue of the lever (32) pivoting, the switch is switched via a second region (32.3) of the lever.

2. The switch-actuating device (1) as claimed in claim 1, wherein the lever (32) and the actuating element (10) are formed in one piece as a single component.

3. The switch-actuating device (1) as claimed in claim 1, wherein the actuating element (10) and the first component (31) are formed from the same material.

4. The switch-actuating device (1) as claimed in claim 1, wherein the first region (32.2) is spaced apart from the pivot pin (32.1) by a smaller distance than the second region (32.3).

5. The switch-actuating device (1) as claimed in claim 1, wherein the pivot pin (32.1) and the actuating surface (11) enclose an angle (a) greater than 0° and smaller than 180°, and wherein the first articulation (10.1) has at least two degrees of freedom.

6. A door-handle module (100), wherein the door-handle module (100) has the switch-actuating device (1) as claimed in claim 1.

7. A vehicle door, wherein the vehicle door has the door-handle module (100) as claimed in claim 6.

8. The vehicle door as claimed in claim 7, wherein the vehicle door and/or the door-handle module (100) and/or the switch-actuating device (1) for a vehicle door form a handle region (110) which has a longitudinal direction (x) in order for a number of fingers of a user to rest along the longitudinal direction (x), wherein the extent of the handle region (110) in the longitudinal direction is at least 2 cm, wherein the actuating surface (11) forms part of the handle region (110) and is arranged over at least 80% of the handle region (110), as seen in the longitudinal direction (x).

9. The vehicle door as claimed in claim 8, wherein the switch-actuating device (1), on at least one side of the handle region (110), is mounted on a component (120) of the door-handle module (100) and/or of the vehicle door via at least one bearing (31.1), which allows a degree of freedom in the longitudinal direction (x), wherein the component (120) consists of a material different to that from which the actuating element (10) and/or the first component or the first component group (31) of the switch-actuating device (1) are/is made, and therefore, in the case of a change in temperature, it is possible to compensate for a relative change in length (L) between the component (120) and the actuating element (10) and/or the first component or the first component group (31) by a relative movement along the degree of freedom of the bearing (31.1).

10. A switch-actuating device (1) for a vehicle door, comprising an actuating element (10) with an actuating surface (11), and a mechanical switch (20) and a mechanism (30), wherein the mechanism is positioned such that a compressive force (F) applied to the actuating surface (11) is transmitted to the switch (20) in order for the switch (20) to be switched, wherein the mechanism (30) includes a first component or a first component group (31), on which the switch is secured, and a lever (32) mounted for pivotal movement relative to the first component or the first component group (31), the lever connected to the actuating element (10) toward a first side of the actuating surface (11), via a first articulation (10.1) at a first region (32.2) of the lever (32), wherein the actuating element (10), toward a second side of the actuating surface (11), is mounted on the first component or the first component group (31) via a second articulation (10.2), wherein the actuating element (10) is of flexible configuration such that when the actuating surface (11) is subjected to manual pressure, the actuating element bends in a flexible manner and causes a distance between the first articulation (10.1) and the second articulation (10.2) to shorten, and therefore causes the lever (32) to pivot such that a second region (32.3) of the lever (32) moves into contact with the switch causing the switch to be switched.

11. The switch-actuating device (1) as claimed in claim 10, wherein the lever (32) and the actuating element (10) are formed in one piece as a single component.

12. The switch-actuating device (1) as claimed in claim 10, wherein the actuating element (10) and the first component (31) are formed from the same material.

13. The switch-actuating device (1) as claimed in claim 10, wherein a spacing between the first region (32.2) of the lever and a pivot axis of the lever is smaller than a spacing between the second region (32.3) of the lever and the pivot axis of the lever.

14. The switch-actuating device (1) as claimed in claim 10, wherein the pivot axis and the actuating surface (11) enclose an angle (a) greater than 0° and smaller than 180°, and wherein the first articulation (10.1) has at least two degrees of freedom.

15. A door-handle module (100), wherein the door-handle module (100) has the switch-actuating device (1) as claimed in claim 10.

16. A vehicle door, wherein the vehicle door has the door-handle module (100) as claimed in claim 15.

* * * * *